(12) United States Patent
Oguma et al.

(10) Patent No.: US 11,329,322 B2
(45) Date of Patent: May 10, 2022

(54) BATTERY MODULE

(71) Applicant: TOYOTA JIDOSHA KABUSHIKI KAISHA, Toyota (JP)

(72) Inventors: Yasumasa Oguma, Sunto-gun (JP); Masatsugu Kawakami, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 16/538,025

(22) Filed: Aug. 12, 2019

(65) Prior Publication Data

US 2020/0112062 A1  Apr. 9, 2020

(30) Foreign Application Priority Data

Oct. 3, 2018 (JP) .............................. JP2018-188329
Oct. 18, 2018 (JP) .............................. JP2018-196957

(51) Int. Cl.
*H01M 10/0585* (2010.01)
*H01M 10/0562* (2010.01)
*H01M 10/0525* (2010.01)
*H01M 10/48* (2006.01)
*H01M 10/613* (2014.01)
(Continued)

(52) U.S. Cl.
CPC ......... *H01M 10/0585* (2013.01); *H01M 4/66* (2013.01); *H01M 10/0525* (2013.01); *H01M 10/0562* (2013.01); *H01M 10/482* (2013.01); *H01M 10/613* (2015.04); *H01M 50/10* (2021.01); *H01M 50/124* (2021.01); *H01M 50/20* (2021.01); *H01M 50/531* (2021.01)

(58) Field of Classification Search
CPC ............... H01M 10/0585; H01M 4/66; H01M 10/0525; H01M 10/0562; H01M 10/482; H01M 10/613; H01M 50/10; H01M 50/124; H01M 50/20; H01M 50/531
See application file for complete search history.

(56) References Cited

U.S. PATENT DOCUMENTS

2005/0147880 A1  7/2005  Takahashi et al.
2005/0168190 A1* 8/2005  Gottsponer ........... H01M 50/30
                                                                    320/107
(Continued)

FOREIGN PATENT DOCUMENTS

CN        1637977 A     7/2005
JP     2005-108693 A    4/2005
(Continued)

*Primary Examiner* — Milton I Cano
*Assistant Examiner* — Jenna Shulman
(74) *Attorney, Agent, or Firm* — Sughrue Mion, PLLC

(57) ABSTRACT

A battery module is provided whereby loss of productivity can be minimized even when producing multiple exterior body parts for different battery module sizes. The battery module of the disclosure has an exterior body and an all-solid-state battery stack encapsulated in the exterior body. The exterior body has a tubular body and a pair of covers. The tubular body has flanges at both open ends. The flanges at both ends of the tubular body and the outer edge sections of the pair of covers are each joined forming joints, with the exterior body being sealed by the joints. The all-solid-state battery stack has one or multiple constituent unit cells. The direction of stacking of each of the layers of the constituent unit cell is in the axial direction of the tubular body.

4 Claims, 7 Drawing Sheets

(51) Int. Cl.
*H01M 4/66* (2006.01)
*H01M 50/20* (2021.01)
*H01M 50/124* (2021.01)
*H01M 50/531* (2021.01)
*H01M 50/10* (2021.01)

(56) References Cited

U.S. PATENT DOCUMENTS

| | | | |
|---|---|---|---|
| 2011/0189534 A1* | 8/2011 | Kim | H01M 50/172 |
| | | | 429/179 |
| 2014/0017538 A1 | 1/2014 | Nakamori et al. | |
| 2014/0193698 A1* | 7/2014 | Liu | H01M 50/529 |
| | | | 429/164 |
| 2015/0010784 A1* | 1/2015 | Takahata | H01M 50/578 |
| | | | 429/7 |
| 2016/0043429 A1* | 2/2016 | Hatta | B60L 58/10 |
| | | | 429/302 |
| 2018/0233711 A1 | 8/2018 | Kato | |

FOREIGN PATENT DOCUMENTS

| | | |
|---|---|---|
| JP | 2007-213930 A | 8/2007 |
| JP | 2012-084247 A | 4/2012 |
| JP | 2012-084248 A | 4/2012 |
| JP | 2012-131486 A | 7/2012 |
| JP | 2014-022098 A | 2/2014 |
| JP | 2014-179220 A | 9/2014 |
| JP | 2016-139494 A | 8/2016 |
| JP | 2017-073398 A | 4/2017 |
| JP | 2018-133175 A | 8/2018 |

* cited by examiner

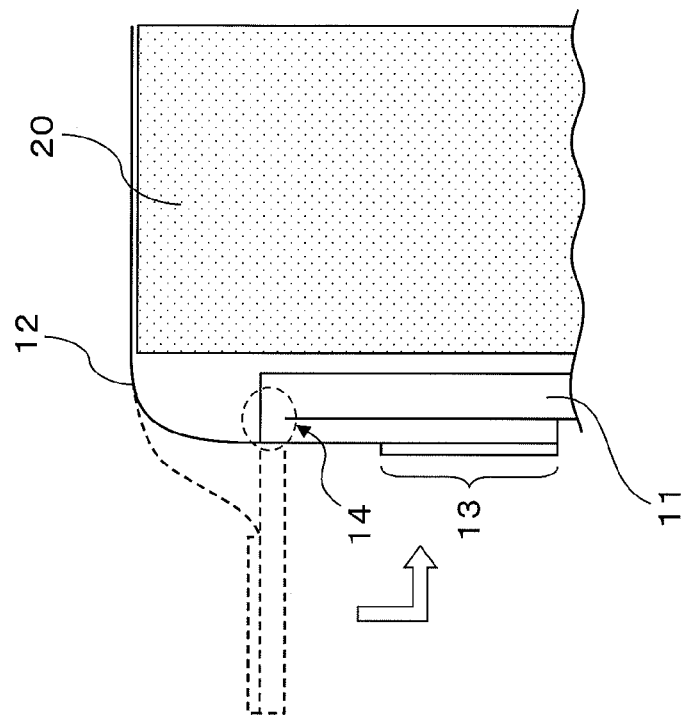
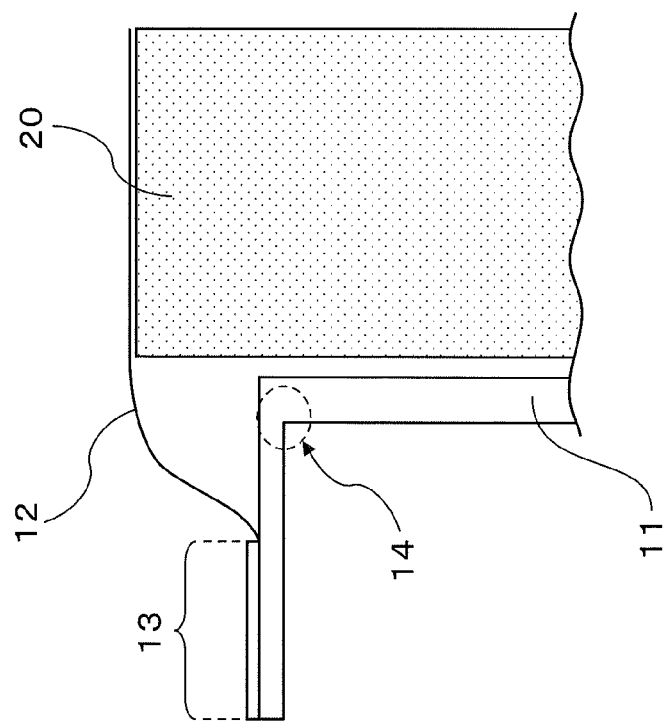

BATTERY MODULE

FIELD

The present disclosure relates to a battery module.

BACKGROUND

Battery modules are formed by connecting together multiple batteries such as lithium ion batteries, nickel hydrogen batteries or other secondary batteries. Because such battery modules yield high output, they are becoming of increasing importance as vehicle mounted power sources, as well as power sources for personal computers and portable terminals.

Various constructions and forms have been proposed for exterior bodies of battery modules, such as in PTLs 1 to 5, for example, from the viewpoint of maintaining battery performance, improving productivity and increasing energy density.

CITATION LIST

Patent Literature

[PTL 1] Japanese Unexamined Patent Publication No. 2012-84247
[PTL 2] Japanese Unexamined Patent Publication No. 2012-84248
[PTL 3] Japanese Unexamined Patent Publication No. 2005-108693
[PTL 4] Japanese Unexamined Patent Publication No. 2014-179220
[PTL 5] Japanese Unexamined Patent Publication No. 2016-139494

SUMMARY

Technical Problem

A battery module using an all-solid-state battery stack has a single all-solid-state battery stack composed of a stack of multiple constituent unit cells, and it therefore has the advantages of allowing the number of battery modules and parts to be reduced, while also increasing the volumetric energy density.

With such battery modules, however, and particularly with all-solid-state battery stacks that have multiple constituent unit cells, the thickness has naturally tended to increase in the direction of stacking of the all-solid-state battery stacks. The present inventors have found that, depending on the size and shape of the location where the battery module is mounted, such as the width of the vehicle at the location where the battery module is mounted when mounted in a vehicle, the shape and size of the battery module may fail to match, creating dead space.

As a method for avoiding creation of such dead space or reducing its size, the present inventors have devised a design for battery module size, and particularly battery module thickness, that can match the sizes and shapes of mounting locations.

When producing battery modules of various thicknesses, however, it is necessary to produce multiple exterior body parts for the shapes of the different battery modules. Having to produce multiple exterior body parts for different battery module sizes generally reduces productivity for the battery module.

It is an object of the present disclosure to provide a battery module whereby loss of productivity can be minimized even when producing multiple exterior body parts for different battery module sizes.

Solution to Problem

The present inventors have found that the aforementioned object can be achieved by the means described below:
<Aspect 1>
A battery module having an exterior body and an all-solid-state battery stack encapsulated in the exterior body, wherein
the exterior body has a tubular body and a pair of covers,
the tubular body has flanges at both open ends,
the flanges at both ends of the tubular body and the outer edge sections of the pair of covers are joined together to form joints, the exterior body being sealed by the joints,
the all-solid-state battery stack has one or multiple constituent unit cells,
each constituent unit cell has a positive electrode collector layer, a positive electrode active material layer, a solid electrolyte layer, a negative electrode active material layer and a negative electrode collector layer, stacked in that order, and
the direction of stacking of each layer forming the constituent unit cell is in the axial direction of the tubular body.
<Aspect 2>
The battery module according to aspect 1, wherein
the pair of covers are cup shapes having their outer edge sections as flanges,
the cup-shaped bottom parts of the pair of covers are oriented to the outer sides of the open ends of the tubular body,
at least one of the pair of covers has lower rigidity than the tubular body, and
the all-solid-state battery stack is longer than the tubular body in the axial direction of the tubular body.
<Aspect 3>
The battery module according to aspect 1 or 2, wherein at least one side of each joint is folded toward the center direction of the tubular body.
<Aspect 4>
The battery module according to aspect 3, wherein the pair of facing sides of each joint are folded toward the center direction of the tubular body.
<Aspect 5>
The battery module according to aspect 3 or 4, wherein the folded side of each joint is folded with the base of the flange of the tubular body as the fulcrum.
<Aspect 6>
The battery module according to any one of aspects 1 to 5, wherein a cooling sheet is disposed so that its main flat side is in contact with the surface of the tubular body.
<Aspect 7>
The battery module according to aspect 6, wherein the cooling sheet is disposed further toward the center of the tubular body than the joints.
<Aspect 8>
The battery module according to aspect 6 or 7, wherein the thickness of the region of the cooling sheet in contact with the surface is no greater than the maximum thickness of the joints protruding from the surface.

Advantageous Effects of Invention

According to the disclosure it is possible to provide a battery module whereby loss of productivity can be minimized even when producing multiple exterior body parts for different battery module sizes.

BRIEF DESCRIPTION OF DRAWINGS

FIG. 3 A is schematic views showing the folded state of a joint in a battery module according to a second embodiment of the disclosure.

FIG. 3 B is schematic views showing the folded state of a joint in a battery module according to a second embodiment of the disclosure.

DESCRIPTION OF EMBODIMENTS

Embodiments of the disclosure will now be explained in detail. The disclosure is not limited to the embodiments described below, however, and various modifications may be implemented within the scope of the gist thereof.
<Battery Module>

The battery module of the disclosure has an exterior body and an all-solid-state battery stack encapsulated in the exterior body.

The exterior body has a tubular body and a pair of covers. The tubular body has flanges at both open ends. The flanges at both ends of the tubular body and the outer edge sections of the pair of covers are each joined forming joints, with the exterior body being sealed by the joints.

The all-solid-state battery stack has one or multiple constituent unit cells. Each constituent unit cell has a positive electrode collector layer, a positive electrode active material layer, a solid electrolyte layer, a negative electrode active material layer and a negative electrode collector layer, stacked in that order. The direction of stacking of each of the layers of the constituent unit cell is in the axial direction of the tubular body.

The battery module of the disclosure may also have a positive electrode collector tab and a negative electrode collector tab. The positive electrode collector tab is electrically connected to the positive electrode collector layer inside the exterior body, and it may protrude outside the exterior body, from the joint between one cover and the flange of the tubular body. Likewise, the negative electrode collector tab is electrically connected to the negative electrode collector layer inside the exterior body, and it may protrude outside the exterior body, from the joint between one cover and the flange of the tubular body. The joints where the positive electrode collector tab and negative electrode collector tab are protruding may be the same.

The battery module of the disclosure may also have constraining pressure applied by a pair of end plates sandwiching the pair of covers.

Figure 1:
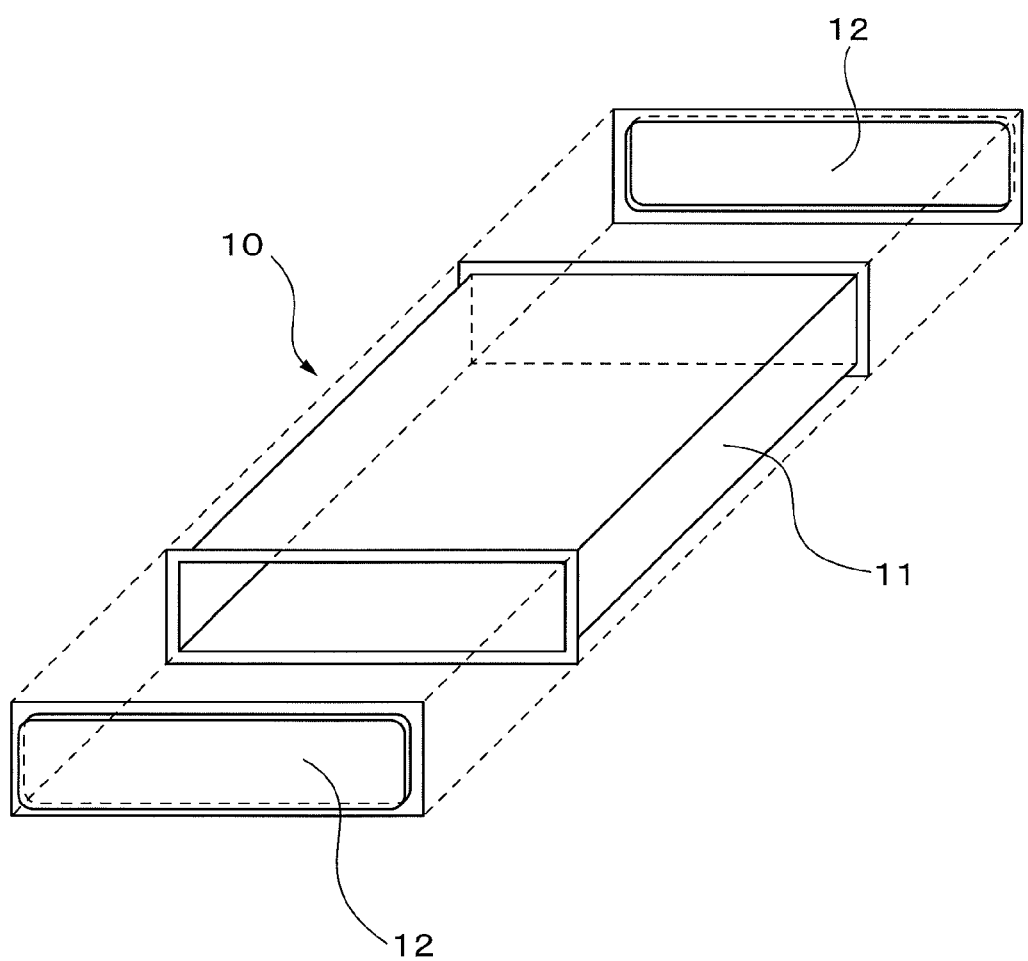
FIG. 1 is a schematic view of an exterior body of a battery module according to a first embodiment of the disclosure.

FIG. 1 is a schematic view of an exterior body of a battery module according to a first embodiment of the disclosure. In FIG. 1, the exterior body 10 has a tubular body 11, with flanges at both open ends, and a pair of covers 12. The flanges at both open ends of the tubular body 11 and the flanges as the outer edge sections of the pair of covers 12 are joined, forming joints. The exterior body 10 is sealed by the joints.

FIG. 1 is not intended to limit the aspects of the battery module of the disclosure.

Figure 2:
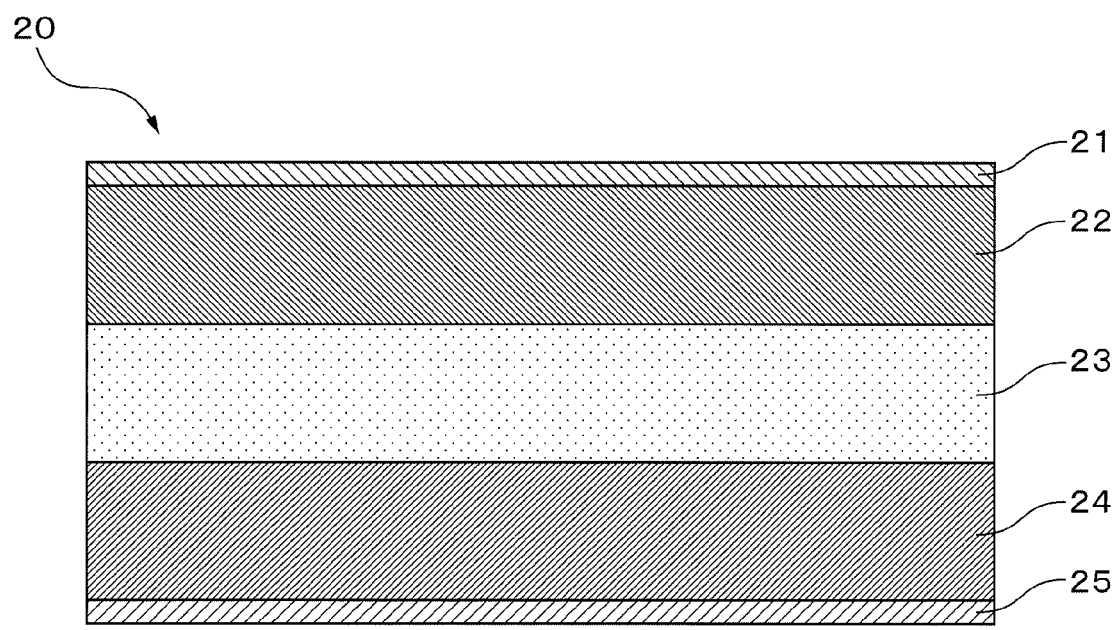
FIG. 2 is a schematic view of an all-solid-state battery stack of a battery module according to the first embodiment of the disclosure.

FIG. 2 is a schematic view of an all-solid-state battery stack of a battery module according to the first embodiment of the disclosure. In FIG. 2, the all-solid-state battery stack 20 is composed of a single constituent unit cell. Each constituent unit cell has a positive electrode collector layer 21, a positive electrode active material layer 22, a solid electrolyte layer 23, a negative electrode active material layer 24 and a negative electrode collector layer 25, stacked in that order.

FIG. 2 is not intended to limit the aspects of the battery module of the disclosure.

Without being limited to any particular principle, it is believed that the principle by which a battery module with improved production efficiency can be provided by the disclosure is as follows.

In the battery module of the disclosure, the direction of stacking of each of the layers composing the constituent unit cell matches the axial direction of the tubular body of the exterior body. Therefore, battery modules with different numbers of constituent unit cells will have different lengths in the axial direction of the tubular body of the exterior body.

With this in mind, the exterior body of the battery module of the disclosure is formed of three parts, including the tubular body and the pair of covers.

Of these, the pair of covers used may be common parts for different battery modules having all-solid-state battery stacks with different numbers of constituent unit cells, so long as the shapes of the constituent unit cells are the same in the in-plane direction.

Therefore, by adjusting the axial direction length of only the tubular body among the three parts that include the tubular body and the pair of covers in the exterior body of the battery module of the disclosure, it is possible to form an exterior body that can be used in a battery module having all-solid-state battery stacks with different numbers of constituent unit cells. For the tubular body as well, particularly when the tubular body is formed by wrapping a sheet-like member, its length in the axial direction can be changed by simply changing the width of the sheet-like member, allowing formation of an exterior body to be used in a battery module that may have all-solid-state battery stacks with different numbers of constituent unit cells.

The battery module of the disclosure allows loss of productivity to be minimized even when producing multiple exterior body parts for different battery module sizes.

Preferably, in the battery module of the disclosure, the pair of covers are cup shapes having their outer edge sections as flanges, the cup-shaped bottom parts of the pair of covers are oriented to the outer sides of the open ends of the tubular body, at least one of the pair of covers has lower rigidity than the tubular body, and the all-solid-state battery stack is longer than the tubular body in the axial direction of the tubular body.

An all-solid-state battery is known to undergo expansion and contraction with charge-discharge depending on the type of materials used, and especially on the type of negative electrode active material. In an all-solid-state battery stack having constituent unit cells each with a structure in which a positive electrode collector layer, a positive electrode active material layer, a solid electrolyte layer, a negative electrode active material layer and a negative electrode collector layer are stacked in that order, expansion and contraction may occur, primarily in the direction of stacking of the constituent unit cells, as charge-discharge proceeds.

In the battery module of the disclosure, the direction of stacking of each of the layers composing the constituent unit cell is the axial direction of the tubular body of the exterior body. When the all-solid-state battery stack has been subjected to charge-discharge, therefore, the all-solid-state battery stack may undergo expansion and contraction primarily in the axial direction of the tubular body of the battery module.

When the gap between the all-solid-state battery stack and the exterior body of a battery module is small, the exterior body may become compressed from inside due to expansion and contraction of the all-solid-state battery stack, resulting in damage. One method for avoiding this problem is, for example, to increase the size of the gap between the all-solid-state battery stack and the exterior body to a degree allowing expansion of the all-solid-state battery stack. Increase in the size of the exterior body, however, results in lower volumetric energy density.

In this regard, if the covers of the battery module of the disclosure have the specified type of shape, orientation and rigidity, and the all-solid-state battery stack has the specified length, then even when the interior of the exterior body of the battery module is approximately the same size as the all-solid-state battery stack, or in other words, even when the gap between the all-solid-state battery stack and the exterior body is small, the covers will be able to easily deform and stretch in the axial direction of the tubular body to match expansion of the all-solid-state battery that occurs during charge-discharge, and the exterior body will be unlikely to suffer damage. Therefore, it is possible to reduce the gap between the all-solid-state battery stack and the exterior body while minimizing damage to the exterior body. More specifically, it is possible to increase the volumetric energy density while minimizing damage to the exterior body caused by expansion of the all-solid-state battery stack.

<Exterior Body>

The exterior body of the battery module of the disclosure has a tubular body and a pair of covers. In addition, the flanges at both ends of the tubular body and the outer edge sections of the pair of covers are each joined forming joints, with the exterior body being sealed by the joints.

The material of the exterior body may be any material that can form the exterior body, and examples include, but are not limited to, metal sheets such as stainless steel sheets or aluminum sheets, or laminate films. When a conductive material such as a metal sheet is used, the surfaces of the inner walls of the exterior body are preferably coated with a resin or the like to provide insulation to the inner surface of the exterior body.

<Tubular Body>

The tubular body of the exterior body has flanges at both open ends. The flanges are regions serving to join the tubular body of the exterior body with the pair of covers. The shape of the tube portion is not particularly restricted so long as it is tubular, and it may be essentially cylindrical or essentially rectangular tubular. From the viewpoint of housing the all-solid-state battery stack inside the exterior body, the shape of the tube portion is preferably essentially rectangular tubular, and especially square tubular.

The tubular body preferably has higher rigidity than at least one of the pair of covers. Higher rigidity means greater resistance of the material to deformation such as stretching in response to stress.

The tubular body may be shaped by any method allowing formation of a tubular shape, and for example, a sheet-like member may be wound and both ends joined to form a tubular shape. When both ends of a sheet-like member are joined to form a tubular shape, the width of the sheet may be adjusted as appropriate so as to facilitate formation of a tubular shape having a length suitable for the thickness of the all-solid-state battery stack.

<Covers>

The battery module of the disclosure has a pair of covers. The shapes of the covers may be any shapes allowing the outer edge sections of the covers and the flanges of the tubular body to be joined. The shapes of the covers may be sheets, and more specifically flat sheets or convex sheets. The covers may also be cup shapes having their outer edge sections as flanges.

At least one of the covers preferably has lower rigidity than the tubular body. Lower rigidity means less resistance of the material to deformation such as stretching in response to stress.

The difference in rigidity between the cover and the tubular body may be provided by using different materials, or by using the same materials but varying the respective thicknesses of the cover and the tubular body, although there is no limitation to these methods.

<Joints>

In the battery module of the disclosure, the flanges at both ends of the tubular body and the outer edge sections of the pair of covers are each joined forming joints, with the exterior body being sealed by the joints.

The means for joining the flanges at both ends of the tubular body and the outer edge sections of the pair of covers may be any means allowing the exterior body to be sealed by the joints that are formed. Specifically, an adhesive may be coated at the joining sections between the flanges at both ends of the tubular body and the outer edge sections of the pair of covers, or the joining sections may be welded by heating.

When the materials of the tubular body and pair of covers are laminated sheets having thermoplastic resin layers on the surface, the flanges at both ends of the tubular body and the outer edge sections of the pair of covers may be joined by heat welding.

The battery module of the disclosure preferably has at least one side of each joint folded toward the center direction of the tubular body. The pair of facing sides of the joints may also be folded toward the center direction of the tubular body. The folded side of each joint may also be folded with the base of the flange of the tubular body as the fulcrum.

The joints in the battery module of the disclosure protrude from the tubular body of the exterior body. A greater degree of protrusion from the tubular body will tend to decrease the volume occupied by the battery module when the battery module has been set on a base substrate, or in other words, it will tend to decrease the volumetric energy density.

Having the joints of the exterior body of the battery module thus folded toward the center direction of the tubular body decreases the degree of protrusion from the tubular body. The volume occupied by the battery module when the battery module has been placed on a base substrate can therefore be reduced, i.e. the volumetric energy density can be increased. The folded shape can be maintained more easily if the flanges of the battery module of the disclosure are made of a highly rigid material. In other words, it is not necessary to anchor the folded section with tape or the like in order to maintain the folded shape.

FIGS. 3A and 3B are schematic views showing the folded state of a joint in a battery module according to a second embodiment of the disclosure. In FIG. 3A, the joint 13 is formed by joining the outer edge section of the cover 12 and the flange of the tubular body 11. In FIG. 3B, the joint 13 is folded toward the center of the tubular body 11, with the base of the flange 14 as the fulcrum.

FIGS. 3A and 3B are not intended to limit the aspects of the battery module of the disclosure.

<All-Solid-State Battery Stack>

The all-solid-state battery stack of the battery module of the disclosure has one or multiple constituent unit cells. When the all-solid-state battery stack has multiple constituent unit cells, each of the constituent unit cells may be electrically connected either in series or in parallel inside the all-solid-state battery stack.

When the all-solid-state battery stack has two or more constituent unit cells, the all-solid-state battery stack may be a monopolar all-solid-state battery stack or a bipolar all-solid-state battery stack.

When the all-solid-state battery stack is a monopolar all-solid-state battery stack, every two adjacent constituent unit cells in the direction of stacking may form a monopolar structure sharing a positive electrode collector layer or negative electrode collector layer.

When the all-solid-state battery stack is a bipolar all-solid-state battery stack, every two adjacent constituent unit cells in the direction of stacking may form a bipolar structure sharing a positive electrode/negative electrode collector layer used as both the positive electrode and negative electrode collector layer.

When the pair of covers are cup shapes having their outer edge sections as flanges and the cup-shaped bottom parts of the pair of covers are oriented to the outer sides of the open ends of the tubular body, the all-solid-state battery stack may be longer than the tubular body of the exterior body in the axial direction of the tubular body of the exterior body. In this case, the all-solid-state battery stack may be in contact with the bottom parts of the pair of covers.

<Constituent Unit Cell>

Each constituent unit cell has a positive electrode collector layer, a positive electrode active material layer, a solid electrolyte layer, a negative electrode active material layer and a negative electrode collector layer, stacked in that order. The layers are not particularly restricted so long as they are layers for battery. The direction of stacking of each of the layers of the constituent unit cell is in the axial direction of the tubular body.

Each constituent unit cell may be a lithium secondary battery, for example, or it may be another type of battery.

<Cooling Sheet>

The cooling sheet of the battery module of the disclosure is preferably disposed so that its main flat side is in contact with the surface of the tubular body.

It is known that an all-solid-state battery stack releases heat when undergoing charge-discharge. It is therefore desirable for a cooling sheet to contact the battery module to cool the all-solid-state battery stack.

If the cooling sheet of the battery module of the disclosure is disposed with its main flat side in contact with the surface of the tubular body, the contact area of the cooling sheet with the battery module can be increased, and the cooling efficiency can be improved.

The cooling sheet is more preferably disposed further toward the center of the tubular body of the exterior body than the joints.

The battery module of the disclosure has joints protruding from the tubular body at both ends of the tubular body. If the cooling sheet is disposed further toward the center of the tubular body than the joints, then it can be disposed without overlapping between the thicknesses of the joints and cooling sheet, and the volume occupied by the battery module and cooling sheet can be reduced when the battery module and cooling sheet are placed on a base substrate. It is thus possible to increase the cooling efficiency of the battery module while increasing the volumetric energy density.

The thickness of the region of the cooling sheet that is in contact with the surface of the tubular body of the exterior body is more preferably no greater than the maximum thickness of the joints protruding from that surface. The thickness of the joints is the length in the direction vertical to the surface of the tubular body where the cooling sheet is contacting at the joints.

With this thickness relationship for the cooling sheet and joints, it is possible to minimize the increase in occupied volume due to provision of the battery module with a cooling sheet.

However, when battery modules are to be combined and placed on a base substrate, and a cooling sheet is to be inserted between the battery modules, it is preferred for the thickness of the region of the cooling sheet that contacts with the surfaces of the tubular bodies of the exterior bodies to be at least twice the thickness of the joints protruding from the surface, in order to allow the cooling sheet to contact with the tubular body of each exterior body.

The material used for the cooling sheet may be any material allowing heat produced during charge-discharge of the all-solid-state battery stack to be conducted out of the battery module, and/or absorbed. Specifically, the cooling sheet may be a metal sheet such as a copper sheet or aluminum sheet, a steel sheet, or a stainless steel plate, with no limitation to these.

Figure 4:
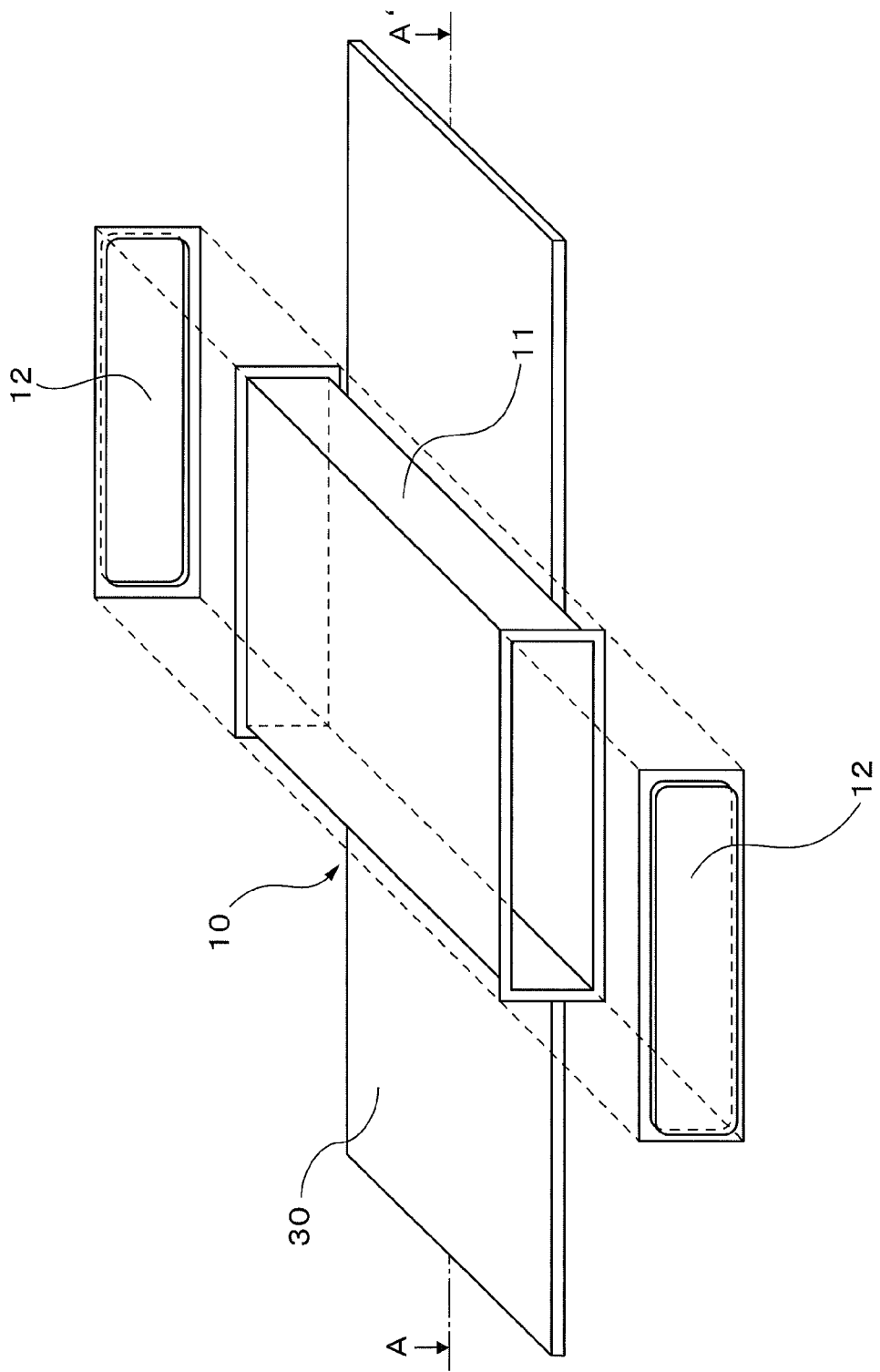
FIG. 4 is a schematic view showing the positional relationship of an exterior body and cooling sheet in a battery module according to a third embodiment of the disclosure.

FIG. 4 is a schematic view showing the positional relationship of the exterior body and cooling sheet in a battery module according to a third embodiment of the disclosure. In FIG. 4, the cooling sheet 30 is disposed in contact with the surface of the tubular body 11 of the exterior body 10. The cooling sheet 30 is also disposed further toward the center of the tubular body 11 than the joints where the tubular body 11 and the pair of covers 12 are joined.

FIG. 4 is not intended to limit the aspects of the battery module of the disclosure.

Figure 5:
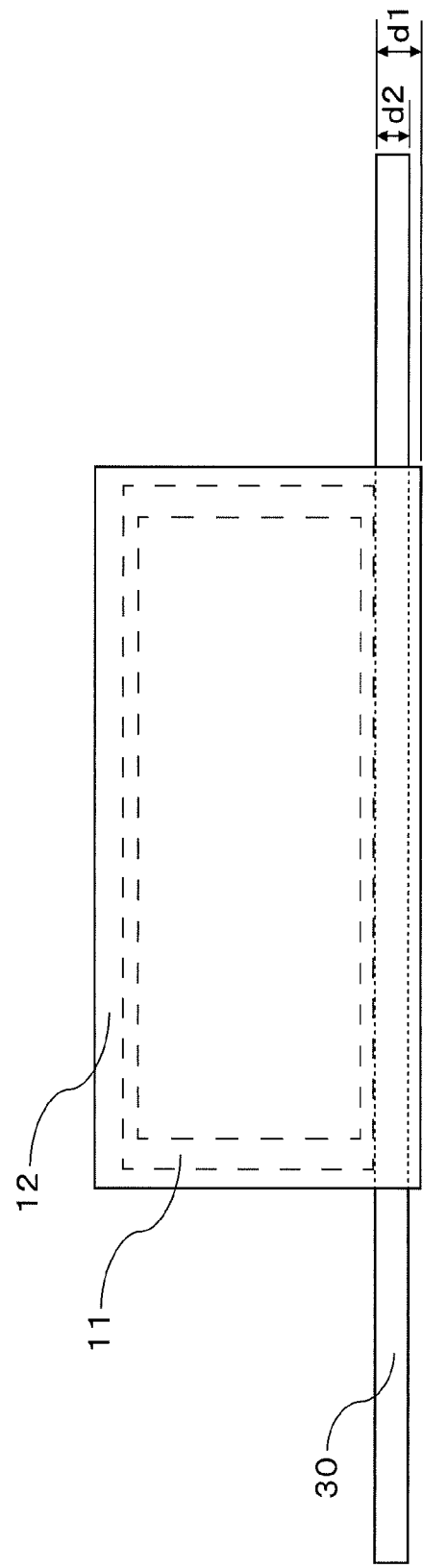
FIG. 5 is a cross-sectional view of the battery module according to the third embodiment of the disclosure, along line A-A' of FIG. 4.

FIG. 5 is a schematic cross-sectional view of the battery module according to the third embodiment of the disclosure, along line A-A' of FIG. 4. In FIG. 5, the thickness $d_2$ at the region of the cooling sheet 30 that contacts with the surface of the tubular body 11 of the exterior body is smaller than the thickness $d_1$ of the joint protruding from the surface of the tubular body 11 of the exterior body.

FIG. 5 is not intended to limit the aspects of the battery module of the disclosure.

Figure 6:
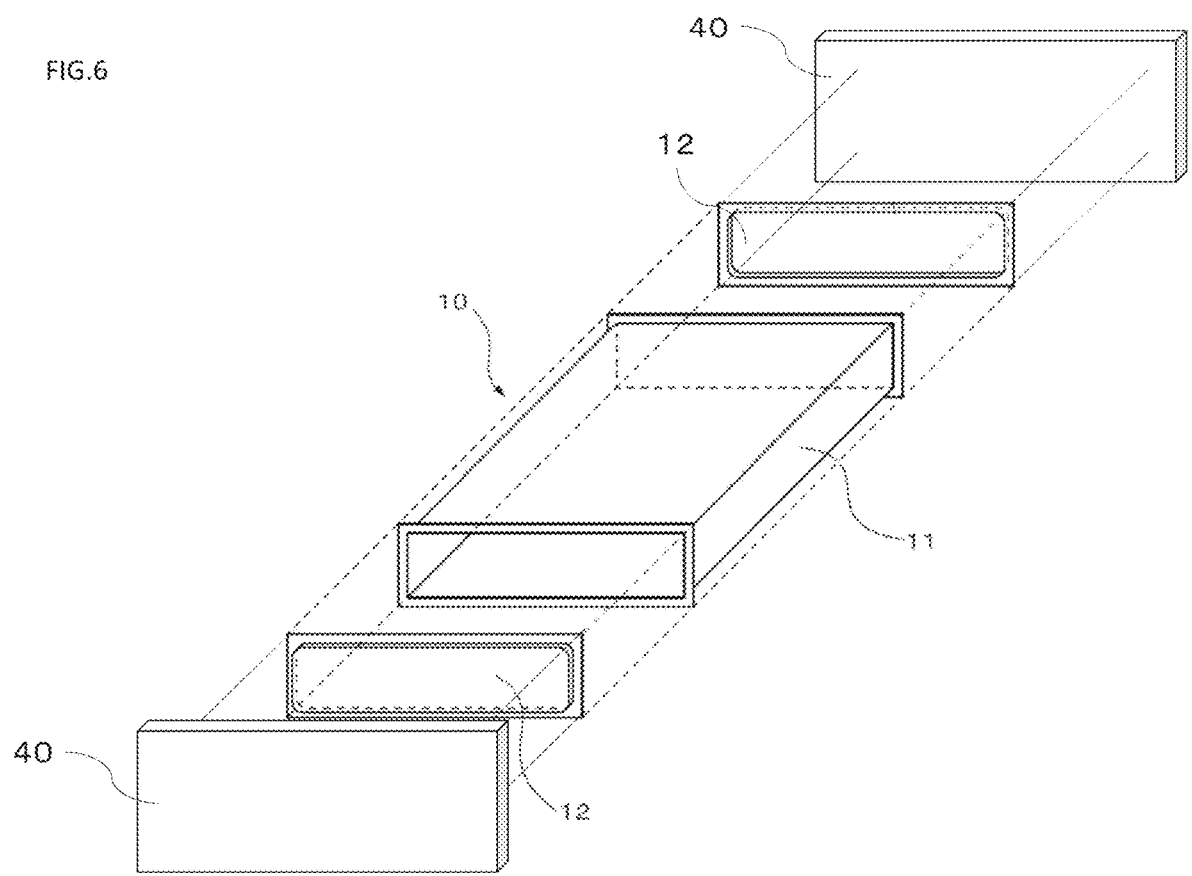
FIG. 6 is a schematic view showing the battery module with a pair of end plates.
Figure 7:
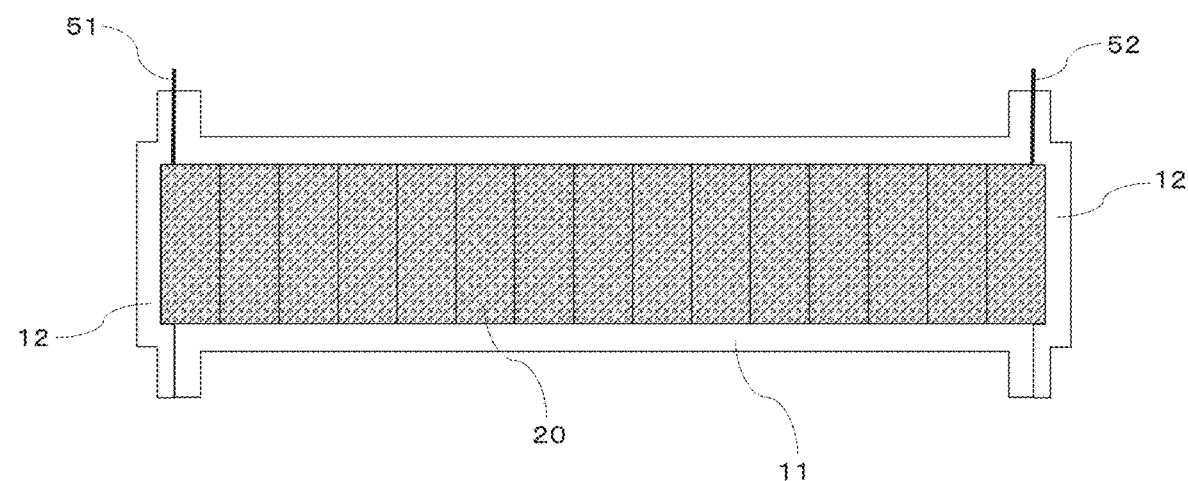
FIG. 7 shows the battery module with collector tabs.

FIG. 6 is a schematic view showing the battery module with respect to a pair of end plates 40. The end plates 40 sandwich the pair of covers 12 and apply a constraining pressure to the battery module. FIG. 7 shows the battery module with collector tabs 51, 52. The battery module of the disclosure may have a positive electrode collector tab 51 and a negative electrode collector tab 52. The positive electrode collector tab 51 is electrically connected to the positive electrode collector layer 21 inside the exterior body, and it may protrude outside the exterior body, from the joint between one cover 12 and the flange of the tubular body 11. Likewise, the negative electrode collector tab 52 is electrically connected to the negative electrode collector layer 25 inside the exterior body 10, and it may protrude outside the exterior body 10, from the joint between one cover 12 and the flange of the tubular body 11. The joints where the positive electrode collector tab 51 and negative electrode collector tab 52 are protruding may be the same.

REFERENCE SIGNS LIST

10 Exterior body
11 Tubular body
12 Cover
13 Joint
20 All-solid-state battery stack
30 Cooling sheet

The invention claimed is:

1. A battery module comprising:
an exterior body; and
an all-solid-state battery stack encapsulated in the exterior body,
wherein
the exterior body has a tubular body and a pair of covers,
the tubular body has flanges at both open ends, wherein the flanges extend outward from an exterior surface of the tubular body and in a direction perpendicular to an axial direction of the tubular body,
each of the pair of covers has flanges at outer edge sections,
the flanges at both ends of the tubular body and the flanges at the outer edge sections of the pair of covers are joined together to form joints on an outside of the exterior body, the exterior body being sealed by the joints,
the all-solid-state battery stack has one or multiple constituent unit cells,
each constituent unit cell has a positive electrode collector layer, a positive electrode active material layer, a solid electrolyte layer, a negative electrode active material layer and a negative electrode collector layer, stacked in that order,
wherein a positive electrode collector tab is electrically connected to the positive electrode collector layer inside the exterior body and protrudes outside the exterior body from the joint at a location between one of the pair of covers and the flange of the tubular body, and a negative electrode collector tab is electrically connected to the negative electrode collector layer inside the exterior body and protrudes outside the exterior body from the joint at another location between the one of the pair covers and the flange of the tubular body,
a direction of stacking of each layer forming the constituent unit cell is in the axial direction of the tubular body,
the pair of covers are cup shaped, wherein outer edge sections of the cup shape are formed as the flanges,
bottom parts of the cup shape of the pair of covers are oriented to outer sides of the open ends of the tubular body,
at least one of the pair of covers has lower rigidity than the tubular body, and
the all-solid-state battery stack is longer than the tubular body in the axial direction of the tubular body.

2. The battery module according to claim 1, wherein a cooling sheet is disposed so that a main flat side is in contact with the exterior surface of the tubular body.

3. The battery module according to claim 2, wherein the cooling sheet is disposed further toward the center of the tubular body than the joints.

4. The battery module according to claim 2, wherein a thickness of a region of the cooling sheet in contact with the surface is no greater than a maximum thickness of the joints protruding from the surface.

* * * * *